Jan. 16, 1968   E. R. WEEKS   3,363,326
DRYER CONTROL

Filed Dec. 7, 1962   5 Sheets-Sheet 1

INVENTOR.
EDWIN R. WEEKS
BY
ATTORNEY

Jan. 16, 1968   E. R. WEEKS   3,363,326
DRYER CONTROL
Filed Dec. 7, 1962   5 Sheets-Sheet 3

INVENTOR.
EDWIN R. WEEKS
BY
ATTORNEY

United States Patent Office 3,363,326
Patented Jan. 16, 1968

3,363,326
DRYER CONTROL
Edwin R. Weeks, Auburn, N.Y., assignor, by mesne assignments, to Hupp Corporation, Cleveland, Ohio, a corporation of Virginia
Filed Dec. 7, 1962, Ser. No. 243,162
6 Claims. (Cl. 34—45)

This invention relates to laundry dryers, and more particularly to a dryer having versatility as to dry cycles and modes of operation, and controls therefore including provision for automatically determining the drying time and heat input to suit load conditions when desired.

Laundry dryers of the type referred to, have a tumbling drum through which heated air is passed to evaporate and carry away moisture from clothes being tumbled in the drum. Dryers of this general type may be controlled by a timer settable at will by the operator, who by experience may select a proper length of time to complete the drying operation. There is an optimum time for drying which varies with the type and size of the wash load, and it is desirable to provide a control that is selectable by the operator, and which is independently capable of automatically performing a drying cycle, of the proper length of time, and which utilizes all of the heat available for a maximum portion of the cycle, so that the drying period is not unduly prolonged, the heat input being curtailed toward the end of the cycle in response to thermostatically indicated conditions and in a manner to complete the cycle expeditiously while preventing possible damage to the load from overheating.

The present invention in one respect, provides an automatic drying cycle which allows the use of maximum heat input during a first stage of drying, of variable length, during which moisture is being evaporated from the load at a rapid rate, the stage being terminated upon a substantial decrease in the rate of evaporation, and a second stage of variable length and decreasing heat input followed by a third stage of fixed duration comprising a period of decreasing heat input followed by a runout heat off period.

More particularly the automatic drying feature of the invention utilizes a timer, the operation of which is suspended to await a terminal drying period, until the elevated temperature of the heated inlet air drops to a predetermined value, indicative of a substantially reduced rate of evaporation and the time for commencement of the terminal drying period. When such temperature is reached, timer operation commences to provide a fixed terminal period, during the first part of which the reduced rate of heat input continues, and during the latter part of which, a cooling off period without heat is provided. Furthermore the timer, in effecting the terminal period, depends on thermostatic control for the initiation thereof, and does not require the reclosing of any timer contacts, the contacts determining the terminal period having previously opened for that purpose, to remain open through such period.

The invention further has to do with a circuit providing for the manual selection of the foregoing automatic drying cycle or other cycles employing preselectable fixed drying periods, with provision for utilizing the latter for either tumbler drying, or drying with the tumbler held against rotation while employing a foldable rack within the tumbler that is readily removed from and inserted into the tumbler through the tumbler access opening. Still a further feature of the invention has to do with an annular seal and front bearing for the drum in the form of a felt ring having a Teflon coated surface in running engagement with a porcelainized cylindrical running surface, formed as a part of a door frame defining the access opening.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts.

Figure 1:
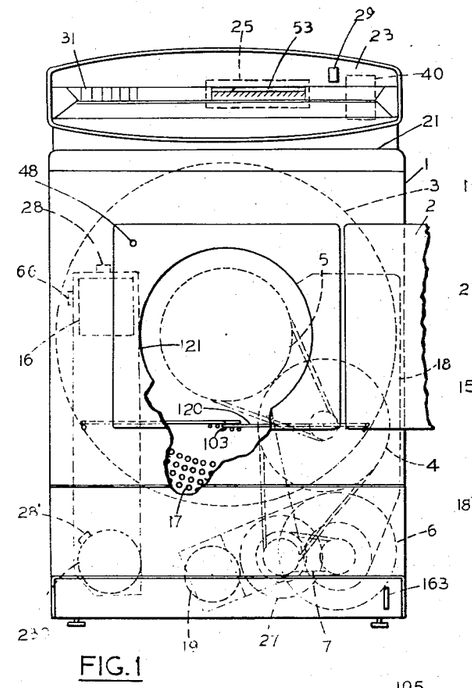
FIGURE 1 is a front elevational schematic view of a dryer, with parts broken away.
Figure 2:
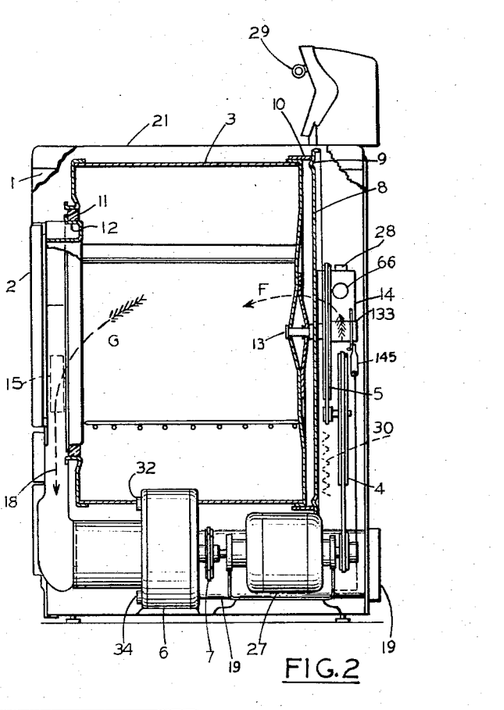
FIGURE 2 is a side elevational schematic view, with parts broken away, and parts in section.

In FIGURES 1 and 2 there is shown schematically a dryer having a cabinet 1, access door 2, shown open in FIGURE 1, a tumbler drum 3, a drive motor 27, belt drives, through pulleys 4 and 5 from the motor to the tumbler, and a blower 6, also belt driven from the motor as at 7. The dryer cabinet is provided with a partition 8 behind the drum and in which the drum is journalled, which has a circular rib 9 adjacent to and concentric with the drum end, on which rides an annular felt seal band 10 carried by the drum.

Figures 5, 8, 9, 10:
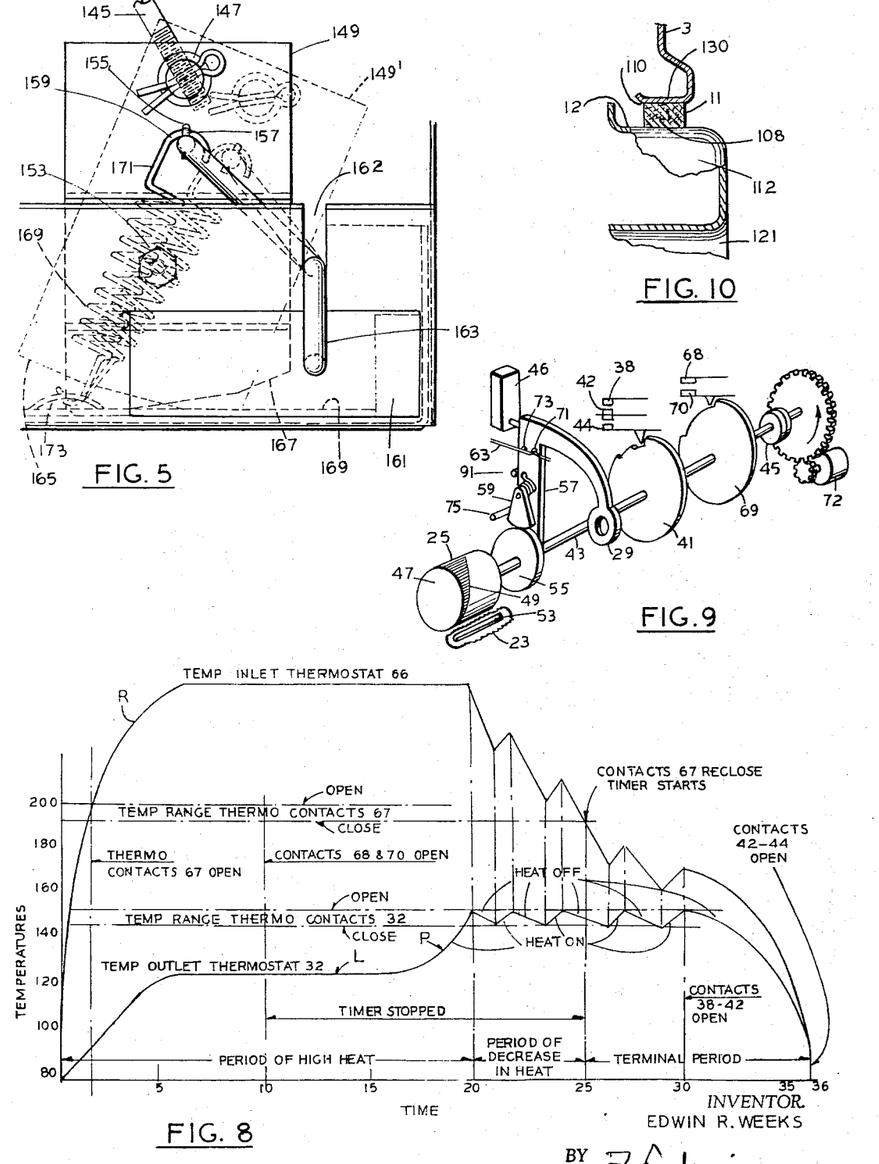
FIGURE 5 is a fragmentary view of the over center mechanism of FIGURE 4.
FIGURE 8 is a typical curve showing operating temperatures during an automatic drying cycle.
FIGURE 9 is a schematic illustration of the timer and control.
FIGURE 10 is an enlarged fragmentary sectional view of the front tumbler and door frame seal and bearing of FIGURE 2.

The annular forward end of the drum, as particularly indicated in FIGURE 10, has an internal cylindrical flange 130, which has cemented thereto, as at 110, an annular felt ring 11, of rectangular cross section. The ring 11 is adapted to form a seal and at the same time run as a bearing upon the cylindrical flange 12 formed as a part of the door frame assembly. The running surface of the flange 12 is porcelainized as indicated at 112, and cooperates with a Teflon surface coating applied to the felt ring 11 as indicated at 108 to provide a quiet smooth running bearing, relatively low in friction. It will be seen that any slight frictional heat which may result over the broad bearing surface thus provided is carried from the porcelainized running surface through the metal of the door frame, and the felt ring, rotating with the drum provides uniform distribution of the load upon the porcelainized door frame flange surface during rotation. The felt ring is readily cut from sheet stock of proper thickness, that has been coated as by spraying Teflon (tetra-fluoroethylene) in liquid form upon one surface thereof. A strip of the desired width, and having a length equivalent to the circumference of the flange 130 is applied to the flange 130 by a suitable adhesive, with the Teflon coating presented inwardly, and the adjoining ends of the ring may have a scarfed joint, with the exposed feathered end extending in a direction opposite to the direction of drum rotation. The porcelainized running surface assures a long running smooth surface free from roughness such as might result from corrosion of an unporcelainized metal ring. The door frame assembly includes a recess for the door 2, and reference to Stelljes et al. 2,964,851, may be had for the general construction thereof. The tumbler drum is provided with a rear stub shaft 13, journalled in the partition 8, on the rear end of which, the drive pulley 5 is mounted, beyond bearing 122.

As will be understood in the art, dryers of the type herein referred to, may employ electric or gas heat for heating the drying medium. In the event electric heat is employed, a resistor 30, may be disposed in the riser column 14 behind the partition 8 as indicated in FIGURE 2, and if the dryer be gas fired, a gas burner, mounted on the base and extending from the front of the cabinet to the burner box or riser column 14 is provided, as is indicated at 230, in FIGURE 1. Whichever source of heat is used, ambient air heated by the gas burner enters the riser column 14, or ambient air enters the riser column to be heated electrically therin. Such hot air passes through an aperture 16 in the partition 8, into the circular space behind the dryer drum and enters the dryer drum through annular rows of perforations 17 in the back wall thereof. (See Arrow F.) Such heated air is drawn through the drum forwardly to a radial opening 15 in the door frame coupled by ducting 18 (see Arrow G) extending to the blower 6, all substantially as shown in Stelljes et al. 2,964,851. The blower 6 discharges into an exhaust duct 19 leading through the back wall of the dryer cabinet.

Mounted on the top deck 21 of the dryer is a control panel 23 behind which is a timer 40, and an indicator 25 and timer control 29 which in the form shown may be similar to that disclosed in a copending application of McWethy and Oles, #185,109 filed Apr. 4, 1962. Upon the panel are control buttons 31 for switches 36, 80 and 92 (see FIGURES 6 and 7) for the selection of various cycles hereinafter referred to in more detail.

Figure 3:
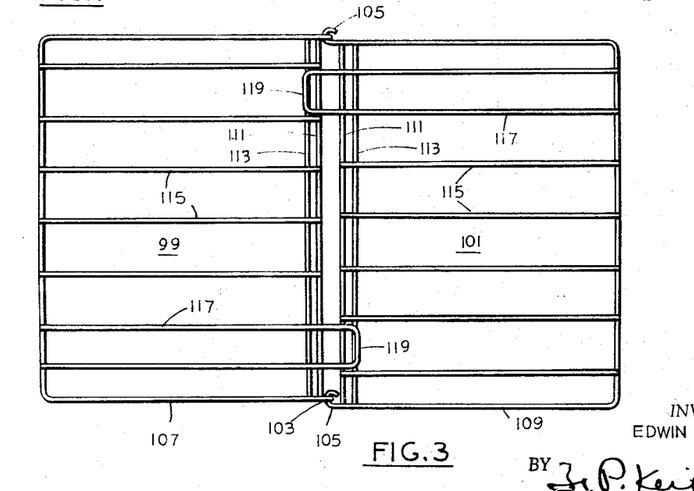
FIGURE 3 is a plan view of a folding dryer rack.

In order to provide for drying within the tumbler, without rotation, while utilizing the controls and blower for circulating drying medium through the tumbler, there is provided a manually operable clutch between the drive pulley 5 and the dryer shaft 13, so that rotation of the drum may be stopped while the motor 27 continues to drive the blower 6. When the drum drive is disconnected, a rack such as is shown in FIGURE 3, comprising two similar grids 99 and 101 pivoted centrally by interengaging eyes 103 and 105 formed in the ends of the outside frame members 107 and 109, may be disposed within the drum as indicated in FIGURE 1. Each grid has transverse members 111 and 113 adjacent the pivotal axis of the eyes, and a plurality of lengthwise bars 115. Each grid is provided with a U-shaped bar 117, the U end 119 of which extends over the transverse members 111 and 113 of the other grid, whereby the two grids when in the open planar position as shown in FIGURE 3, and at 120 in FIGURE 1, become a self supporting rack, adapted to be bridged across the interior of the drum, in chordal relation thereto approximately at the level and substantially tangential to the lower edge of the circular door opening 121. The grid may support delicate items such as hose or lingerie, which may dry quickly and might be damaged by tumbling, drying being effected by the blower induced flow of air through the drum. The rack when folded is of a size so that it may readily be removed from the drum through the circular access opening 121, when the drum is to be employed as a tumbler.

Figure 4:
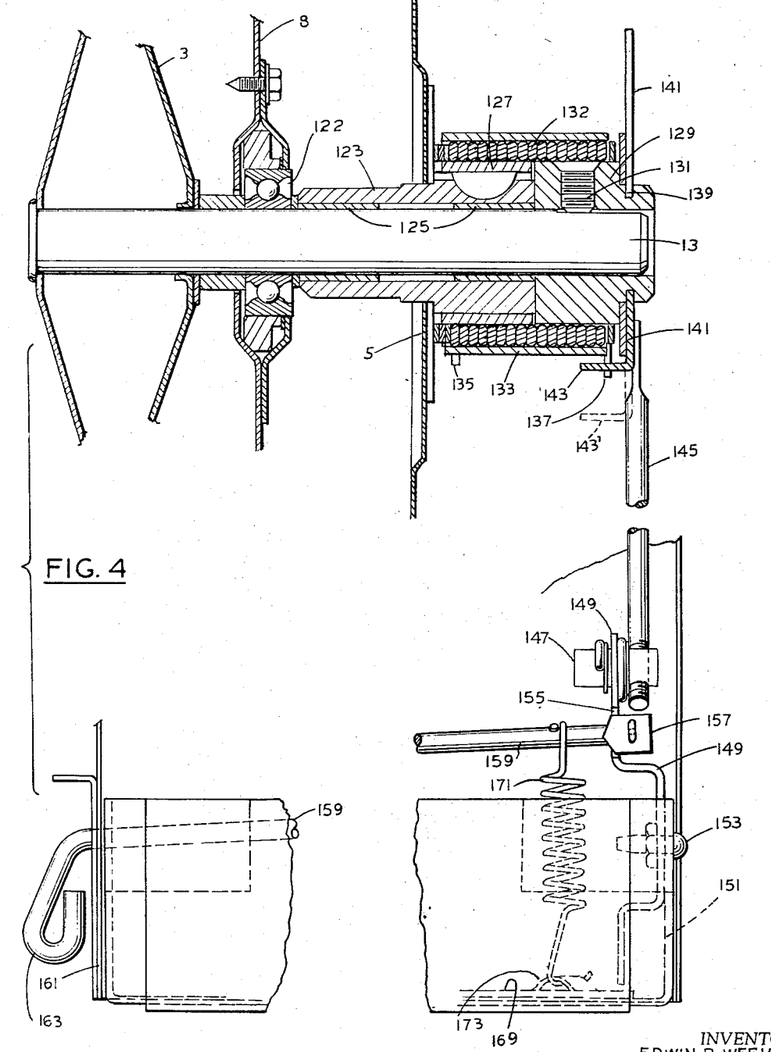
FIGURE 4 is a fragmentary sectional view showing the tumbler drive clutch, and controls therefor.

In order to engage or disengage the drive pulley 5 from the shaft 13, the pulley 5 is provided with a hub 123 journalled on the shaft on spaced bearings 125. The hub is provided with a cylindrical collar 127 keyed thereon, located adjacent to a cylindrical collar 129 of like outer diameter, the latter being affixed to the shaft 13, as by the set screw 131. Disposed about the collars 127 and 129 is a coil spring clutch 132 having light engagement with both collars so that upon rotation of the pulley 5, in the normal direction as driven by the motor 27, the coil spring tends to contract, providing a positive drive between the collars and from pulley to shaft.

To release the clutch, there is provided a control sleeve 133 disposed loosely about the coil spring 132, having a notch in one end to receive a radial end 135 of the coil spring. The other end of the sleeve is provided with a radial lug 137. Slidably disposed for radial movement in a circumferential guide groove 139 in the end of collar 129, is a bifurcated member 141 having a projection 143 which is adapted to be disposed in the path of the lug 137, to disengage the clutch. The member 141 may be moved downwardly by a manual control so that the projection is in the position indicated at 143', to clear the lug 137 to allow the clutch to engage. It will be understood that when the rotation of sleeve 133 is stopped, the left hand end of the coil spring 132 is held against rotation, and the light frictional contact of the collar tends to unwind or expand the spring, out of engagement with the collar 127, whereby the pulley runs free. It will be understood that the drum 3 by reason of the slight friction of the forward felt bearing 11 is sufficiently held against any tendency to rotate.

To release or engage the clutch, the member 141 is affixed to a rod 145 extending diagonally downward to the lower region to one side of the rear of the cabinet, where it is threaded into a crank pin 147 that extends through an aperture in the rock lever 149, the latter being pivoted upon the back base frame member 151 as at 153. Extending through a slot 155 in the rock lever 149, is the spade end 157 of a control rod or rock shaft 159 extending diagonally to the front of the machine, and through the front base plate 161, where a manual operating lever is conveniently provided as at 163, a slot 162 being provided.

The lower end of the rock lever is provided with limit stops in the form of a heel and toe 165 and 167 respectively, which are adapted to engage the base frame 169 to provide limits to the movement thereof, and a tension spring 171 connected between the rod 159, and a struck up loop 173 in the base frame 169, provides over center means to hold the lever 149 in either of its two end positions, so that the clutch is held positively engaged, or disengaged except upon the application of manual control to rock the lever 163 and rock shaft 159 and lever 149 to move the same from one limit position to the other, as shown at 149 and 149'.

The dryer as previously indicated, in addition to the manual control over the mode of driving, as by tumbling, or rack drying, is provided with controls 31 whereby an operator may select three different ranges of drying temperature, or drying without heat, and any desired drying time by manually setting the timer. Additionally the operator may select an automatic drying cycle capable of providing a cycle of drying utilizing an automatically variable period of maximum rate of heat input followed by an automatically variable period of decreasing rate of heat input, which is followed by a terminal period of fixed duration, during the fore part of which, there is a decreasing rate of heat input, and during the latter part of which, cooling off without heat is provided. The automatically variable periods respond in length of time to the type and size of load. The controls aforesaid operate in the same manner, whether the source of heat is electric or gas, as will appear from the circuits of FIGURES 6 and 7.

Figure 6:
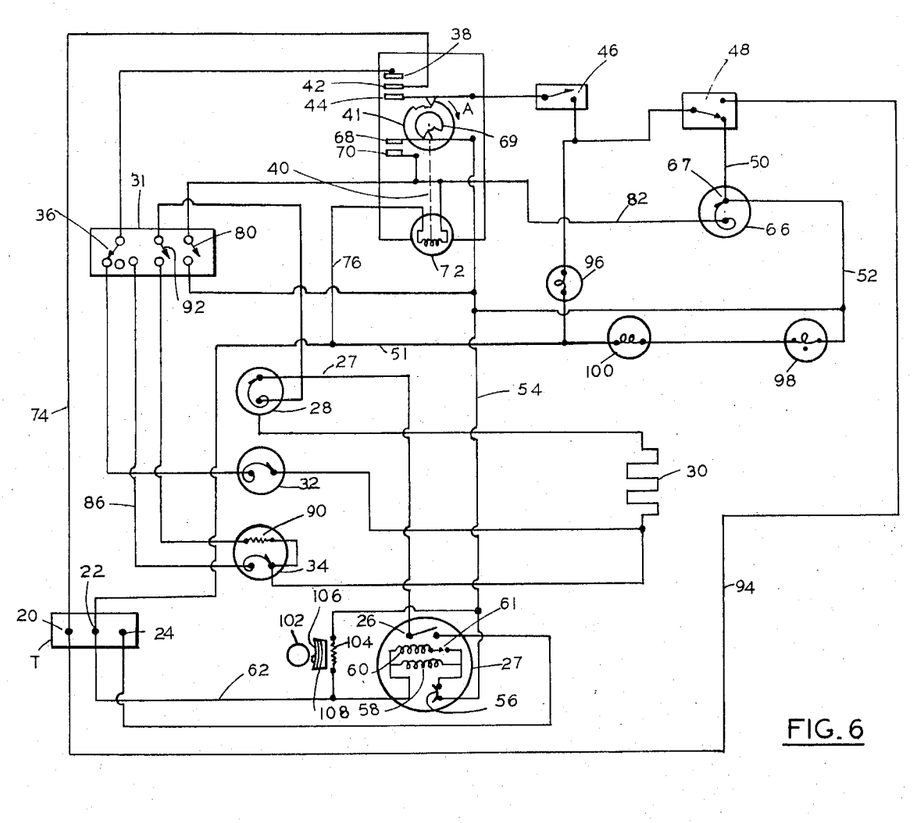
FIGURE 6 is a circuit diagram for electric heat operation.

Referring to the circuit diagram of FIGURE 6, which is applicable when electric heating is utilized, there is shown a 230-volt line terminal board T, having 230 volt terminals 20 and 24 with a neutral terminal 22. Terminal 24 leads to one side of the air heater resistance 30, through centrifugally closed switch contacts 26 on the tumbler drive motor 27, and a safety thermostat 28 which is normally closed, and which may have a protective opening temperature of 275 degrees. In the electric dryer such safety thermostat may be located at the upper end of the heater riser as indicated in FIGURE 2. The other side of the heater 30 is connected to a thermostatic switch 32 leading to one contact of a three position manual selector switch 36. Such thermostatic switch may have a temperature range so as to open at 150 degrees and close at 142 degrees. The heater is also connected to a delicate thermostatic switch 34, which may have a temperature range such as to open at 135 degrees, and close at 125 degrees, and such thermostat is in turn connected to a second contact of selector switch 36. It will be understood that thermostats 32 and 34 will be located in the dryer outlet so as to be sensitive to the temperature of the air discharged therefrom and may be located on the exhaust blower as indicated at 32 and 34, in FIGURE 2.

A motor driven timer 40, having a two step cam 41 adapted to actuate contacts 38, 42 and 44, and a second cam 69 adapted to actuate contacts 68 and 70 is provided. Such timer is adapted to be set manually by rotating the shaft thereof clockwise, to the extent desired, and in a direction opposite to that of the drive of the timer motor 72. The timer motor returns the cam to the off position, from such setting as is manually made. The cam 69 is adapted to open contacts 68 and 70 about eleven minutes prior to the timer returning to the off position. The two step cam 41 is adapted to open contacts 38 and 42 about six minutes before reaching the off position, and to open contacts 42 and 44 on reaching the off position.

The tumbler drive motor has one end of its field winding 58 connected to the neutral terminal 22. The other end of the field winding is connected through a motor over load thermal cutout 56 and in a circuit including a door switch 48, shown in door closed position, a start switch 46 and timer contact 44. Upon manually setting the timer, by rotation clockwise in the direction of arrow A from the off position shown, contacts 42 and 44 are closed, to complete a circuit through lead 74 to terminal 20, whenever start switch 46 is closed. It will be seen that the starting winding 60 with its centrifugal switch 61 is in parallel with the field 58.

The three position selector switch 36 is connected to timer contact 38, so that when the timer is manually set to close contacts 38, 42 and 44, the heater 30 may be energized, through either thermostatic switch 32 and 34, assuming centrifugal switch 26 is closed in response to the tumbler drive motor attaining running speed.

The timer motor 72 has one terminal connected through lead 76 to neutral terminal 22. The other timer motor terminal is connected to contact 70, and through contacts 67 of inlet thermostat 66 to lead 50 so that the timer is energized through door switch 48, start switch 46, timer contacts 42 and 44 and lead 74 to terminal 20. The inlet thermostat 66, located on the riser 14, is responsive to the temperature of air heated by the resistance 30 and delivered to the tumbler, and opens its contacts 67 when the temperature exceeds 200 degrees, and closes its contacts when the air inlet temperature drops to 190 degrees. Thus so far as thermostat 66 is concerned, motor operation of the timer is suspended when the inlet temperature exceeds 200 degrees, and is not reactivated until the temperature drop to 190 degrees. The timer motor is also energized whenever it is manually set to close contacts 68 and 70, which occurs when the cams are set at least 11 minutes from the off position, contact 68 being connected in a circuit to door switch 48, through leads 54, 52 and 50, paralleling thermostat contacts 67, and leads 52 and 82.

With selector switch 36, in the automatic dry cycle position shown, with switches 80 and 92 open, the automatic drying cycle is initiated by the setting of the timer to a position about 20 minutes from the off position, and closing the start switch 46. Thus contacts 38, 42 and 44 are closed and also contacts 68 and 70. When the tumbler drive motor reaches speed, the circuit through heater 30 is completed by closing of switch 26, and the temperature of the air drawn from the inlet through the tumbler to the exhaust duct rapidly rises, and in approximately two minutes time, the air temperature in the inlet duct exceeds the temperature of the thermostat 66, opening contacts 67. The timer continues to run until contacts 68 and 70 open, which suspends the timer 11 minutes short of its off position.

Air heated at a maximum rate is delivered through the tumbler and is cooled by evaporation of the moisture in the clothes contained therein. So long as evaporation continues at a rapid rate, the exhaust air temperature is below 150°, the temperature necessary to open the contacts of thermostat 32. As soon as the rate of evaporation decreases substantially, due to the clothes becoming partially dry, the temperature in the exhaust duct at thermostat 32 rises to 150 degrees opening the contacts of thermostat 32, and cutting off the heater 30. With the heat cut off, the exhaust duct temperature soon drops to 142 degrees, whence contacts of thermostat 32 reclose and heat is restored. As the clothes become drier, the increments of time between heater cut off and heater on, tend to increase, and the increments of time the heater is on tend to decrease. During the time the heater is off, the inlet air temperature decreases and when the heat is restored the inlet air temperature rises. Since the increments of time the heat is on, decrease in length, the temperature rise during each increment at inlet thermostat 66 becomes smaller, and the temperature drop during each increment during heat off increases. In time the temperature at thermostat 66 drops below 190 degrees, and reclosure of contacts 67 occurs, which reenergizes the timer motor 72. The timer proceeds through its terminal eleven minute period previously established by the opening of contacts 68 and 70. Contacts 38 and 42 open thereafter in five minutes, cutting off all heat, and the timer then provides a cooling off run out period of six minutes, following which contacts 42 and 44 open, deenergizing the tumbler drive motor 27 and completing the cycle.

The operation of the automatic dry cycle may be considered in connection with the diagram of FIGURE 8. In this diagram an arbitrary overall time of 36 minutes is indicated. It will be understood however that this period varies with the type of load. When the cycle is to be commenced, the selector switch 36 is in the position shown and switches 80 and 92 are open. The timer is manually rotated to the auto dry position, a setting which may correspond to 20 or 21 minutes. Thereafter start switch 46 is closed. Promptly the inlet air temperature begins to rise to a value well over 200 degrees, but below the temperature of the safety thermostat 28, as is indicated by the rise in temperature at R. In approximately two minutes time, the temperature at thermostat 66 exceeds 200 degrees, opening its contacts 67, which would suspend timer operations except for contacts 68 and 70 which are still closed. Thus the timer motor continues to return the cams toward the off position until contacts 68 and 70 open, at which point the timer is stopped, approximately eleven minutes short of the end position.

The inlet temperature continues at a high level. The temperature at the outlet thermostat 32 rises somewhat, to a level such as L, where it remains for a period while evaporation of moisture from the clothes continues at a high rate. When a substantial amount of moisture has been evaporated and the rate of heat absorption by evaporation decreases below the rate of heat input, the temperature at thermostat 32 rises as at P. When the temperature of 150° is reached, thermostat 32 opens the circuit to the heater 30, this being indicated as occurring 20 minutes after the cycle commenced. The outlet temperature then drops to 142°, the closing temperature of thermostat 32, whereupon heat is restored. As drying continues, successive heat on increments of decreasing duration, and intervening heat off increments of increasing duration occur to the end that the temperature at thermostat 66 drops to its reclosing temperatures of 190°, which has been indicated as occurring 25 minutes after commencement of the cycle. Thereafter the timer provides for an eleven minute terminal period, during five minutes of which heat is cycled on and off, after which the heat is cut off for a run out period of six minutes.

It should be understood that the time at which contacts 68 and 70 open need merely be after the opening of contacts 67, but not so long after as to be still closed when contacts 67 reclose, and setting the timer at about 20 or 21 minutes is but an arbitrary choice, allowing adequate time for the contacts 67 to open, and at the same time suspending the timer eleven minutes short of its end position, an adequate time prior to the reclosing of contacts 67. While for illustrative purposes the period of high heat is shown as 20 minutes, this period varies entirely in accordance with the load, and its length is entirely under the control of the thermostat at 32, the period ending when the exhaust temperature reaches 150° degrees. Likewise for illustrative purposes the period of decreased heat is shown as occuring for five minutes; however this period varies entirely in accordance with the actual time occurring between the initial opening of thermostat 32 and closing of contacts 67 of thermostat 66, and depends on the conditions. Thus only the terminal period of eleven minutes is of preset duration, and determined by cam 69.

While it has been said that the increments of heat on gradually decrease in length and the increments of heat off increase, during the on and off cycling of thermostat 32 during the period of decrease in heat, even this may vary due to a sudden redistribution of clothes during the tumbling, which might suddenly expose some heavy wet article, which had been previously balled up within articles which had more nearly reached the dry stage. Thus the period of decreased heat may be temporarily modified in length entirely by the condition of the load being dried.

Figure 7:
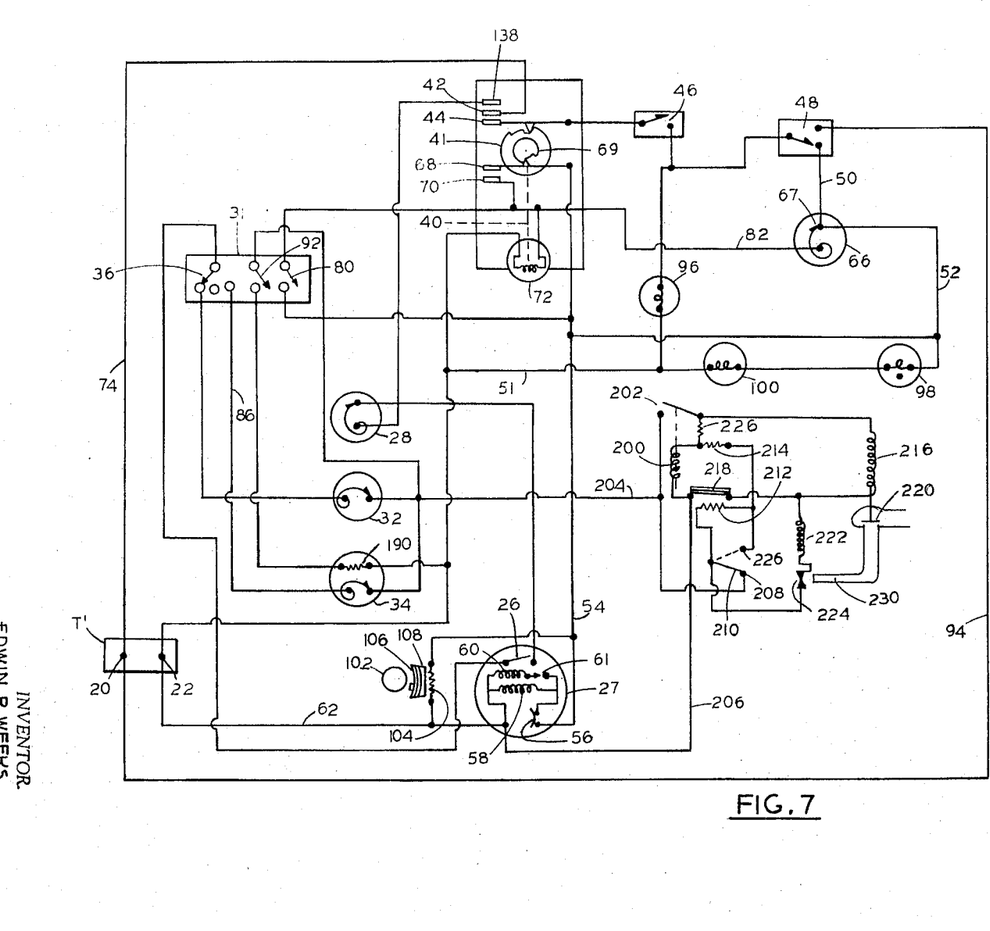
FIGURE 7 is a circuit diagram for gas heat operation.

To facilitate an understanding of the control of McWethy and Oles, application #185,109, as used in connection with the circuits of FIGURES 6 and 7, a schematic illustration of the timer, cams, manual control and indicator are shown in FIGURE 9. As shown, the timer motor 72 is adapted to drive the shaft 43 in a counter clockwise direction through a friction slip clutch 45. The timer may be advanced by a step by step movement as for example shown in Hall Patents 2,227,133 and 2,313,064 issued Dec. 31, 1940 and Mar. 9, 1943, respectively. Secured to the shaft 43 are cams 41 and 69, and an indicator drum 47 having a helical indicator line 49 adapted to cooperate with a stationary reference slit 53, which in practice may be a lengthwise slit in the panel 23, disposed in front of the drum 47. Also fixed on the shaft is a friction disk 55. Pivotally mounted on the shaft, adjacent the friction disk 55 is a manual control arm 57, having pivotally mounted thereon, a friction shoe 59 which is adapted to resiliently engage the disk 55 for rotating the same clockwise when the control arm is angularly rotated in a clockwise direction. As shown, the arm is in its normal end position for dryer operation against stop 91, where it is held by a detent spring 63 engaged in a recess 71. In this position, the arm engages, and closes the contacts of switch 46. The arm may be advanced to a second position, where detent spring is engaged in recess 73, in which position switch contacts 46 are opened. During this angular movement, the friction shoe is held clear of the disk by a stop 75. Any advance of the arm clockwise beyond the second position engages the shoe 59 with disk 55, to rotate the cams and indicator clockwise through any desired angle, as by several oscillatory movements of the arm 57, it being understood that during counterclockwise movement of the arm, the shoe 59 overrides the disk 55. When the timer cams have been rotated to the desired extent, as indicated by the indicator line 49, the arm is returned to the end position to close switch 46, and the cycle selected commences, assuming the cams 41 and 69 have been rotated beyond the angular positioning at which cam operated switch contacts 38, 42 and 44, and contacts 68 and 70 are closed, and to such additional extent as is necessary for the particular drying operation desired.

If an ordinary manually controlled drying cycle is desired, of a predetermined length of time, selector switch 80 is closed which shunts contacts 68 and 70, as well as the inlet air thermostat contacts 67, so that the timer motor is energized without interrupion, when set to any desired drying time.

As drying progresses, with selector switch 80 closed, and selector switch 36 in the position shown, the heat is on continuously until the temperature in the exhaust duct reaches 150 degrees. From that time on, heat is cycled off and on as the thermostat 32 opens and closes in response to temperature variation between 150 and 142 degrees.

If it is desired to dry delicate fabrics which are best not subjected to the temperatures of ordinary fabrics, the selector switch 36 may be set to complete a circuit through lead 86 to the thermostat 34, having a lower temperature range such as 125°–135°, so that drying will be effected at temperatures, not exceeding such lower temperature range. For special fabrics, the thermostat 34 may be biased to operate at a lower temperature by means of biasing heater resistance 90 thrown in circuit across the heater 30, or the flame ignitor, by the closing of selector switch 92.

If damp drying is desired in connection with regular fabrics, the same selector switches as used for special fabrics may be employed to attain such results.

By merely closing selector switch 80, and opening the remaining selector switches 36 and 92, and setting the timer, an air fluff, by tumbling without heat is attained, for such period as the timer is set.

By means of a connection 94 to terminal 20, and the other pole of the double pole single throw door switch 48, provision is made for illumination within the dryer, when the door is opened, lamp 96 being energized through lead 94, switch 48, and lead 51. Similarly when the door switch 48 is in door closed position, provision may be made for energization of a germicidal lamp 98 disposed within the dryer, the same operating through a ballast 100, and deriving its energy from lead 51, closed timer contacts 42 and 44 and lead 74, the circuit being completed through lead 52, switches 48, 46.

Further, a cycle end bell signal is provided as at 102, which rings shortly after the motor 27 is deenergized at the close of the cycle. Such signal comprises a heater resistor 104 connected in parallel with the motor, which heats a bimetallic bar 106 which is warped when cold, and reverse warped when heated. When the motor is deenergized the heater resistor is also deenergized, and the bar tends to return to its cold warped position. The bar being confined at its end within a resilient support bracket 108 returns to its cold position with an over center snap action which rings the bell.

Provision is also made for operating the dryer on 115 volts, in that by bridging terminals 22 and 24, and connecting terminals 20 and 22 to a 115 volt line, dryer performance on 115 volts may be had, although the drying time is increased and insufficient heat is developed for employing the automatic dry cycle.

If the dryer be of the gas fired type, a somewhat modified circuit is employed as in FIGURE 7. In such case the safety thermostat may be located on the gas burner as indicated at 28', in FIGURE 1. In this circuit, instead of the heating resistor 30, powered from a 230 volt line, as by the circuit extending from line terminal 24 through motor switch to safety thermostat 28 to resistor 30 as in FIGURE 6, which is in turn in circuit with either thermostat 32 or 34, a gas burner ignition circuit is provided, connected to thermostats 32 and 34 by lead 204 and to the line terminal 22.

In this circuit, the selector switch 36, instead of being directly connected to contact 38, is connected through centrifugal switch contacts 26 and safety thermostat contacts 28 to contact 38. Additionally the biasing resistor 190 of thermostat 34, instead of being connected through switch 92 so as to be in parallel with heater resistor 30, and accordingly being adapted for 230 volt operation as in FIGURE 6, is modified to provide the same heating effect on 115 volts. To obtain the same operation it will be seen that the resistor 190 is connected between terminal 22, selector switch 92 and to thermostat contacts of thermostat 34, so that whenever selector switch 92 is closed, and the contacts of thermostat 34 are also closed, biasing heat to depress the operating temperature range of thermostat 34 is had.

In the gas fired dryers of FIGURE 7, the burner control comprises a safety relay having a solenoid 200, adapted to close contacts 202, whenever line potential is applied to leads 204 and 206, the solenoid 200 being initially energized by potential from lead 204, through the cold contacts 208 of flame sensing switch 210, warp switch resistor 212, and resistor 214, solenoid 200 to lead 206. As soon as contacts 202 close, gas valve solenoid 216, connected through warp switch contacts 218 to line 206, is energized, opening the main burner gas valve 220. At the same time, vibrator 222 having sparking contacts 224 adjacent the burner, is energized for ignition. Shortly after flame ignition, the flame sensing switch 210 opens contacts 208, closing contact 226, thus opening the circuit from lead 204 to the vibrator 222, and shunting warp switch resistor 212. While the vibrator coil will be seen to be in a circuit across relay solenoid 200, current flow is so highly restricted by resistance 214 as to render the same inactive. With solenoid switch contacts 202 closed, solenoid 200 is energized through resistor 226, which permits passage of enough current to energize solenoid 200 sufficiently to hold contacts 202 closed so long as there is no momentary power failure. Any momentary power failure allows relay contacts to open, closing the gas valve, and no reignition can occur, until the flame sensing switch returns to cold position. It will be understood that should the burner fail to ignite, current flow through heater resistance 212 results in the opening of warp switch contacts 118, closing the gas valve.

It will thus be seen that in all material respects the circuits of FIGURE 6 and FIGURE 7, are the same except for the changes described, necessitated by the substitution of gas heat for electrical resistance heat. Thus their operations, so far as being versatile in the described choices of drying cycles, are alike, and the same controls operate in the same manner for both the electrically heated and the gas heated form.

It will be seen from the foregoing, that by opening switches 36, and 92, and closing switch 80, air drying without heat may be had. With switch 36 in the position shown, and closing switch 80 only, any desired drying time may be selected, for regular fabrics, employing the temperature range of thermostat 32. By closing switch 36 to complete a circuit through lead 86, and closing switch 80, delicate fabrics may be dried utilizing the lower temperature range of thermostat 34. If special fabrics requiring a still lower temperature are to be dried, switch 92 is additionally closed. In the case of delicate fabrics, or special fabrics, the timer will be set for a shorter duration. If a damp dry effect is desired, for regular fabrics, the same circuits as used for special fabrics may be employed but with a longer timer setting. Rack drying with blower on and no heat may be had.

Any of the foregoing selections may be made for rack drying, with the tumbler declutched, the temperature ranges and timer setting be chosen to meet the needs.

For the automatic drying cycle, however, only the switch 36 is closed, in the position shown in FIGURES 6 and 7, and the timer set roughly in the 20–21 minute position as set forth.

While a single form of the invention has been illustrated and described, with the modifications required for gas and electric heating, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. The method of drying laundry in a laundry dryer which comprises drying said laundry at a maximum rate of heat input, with air introduced into the dryer inlet at a high temperature for a period of variable length, terminating said period of variable length upon detection of a temperature rise in air outlet temperature from said dryer indicating a reduction in the rate of heat absorption due to evaporation below the rate of heat input, drying said laundry for a subsequent variable period of time with gradually reducing heat input, and drying with reducing heat input for a fixed portion of a predetermined terminal period of fixed duration, commencing upon the air inlet temperature dropping to a predetermined temperature.

2. A laundry dryer comprising a tumbling drum, air inlet means and air outlet means associated with said drum, means for rotating the drum, means for causing a flow of air through the drum from said air inlet means to said air outlet means, a thermostatic switch associated with said air inlet means adapted to open at a predetermined temperature, means associated with said air inlet means for heating air supplied thereto to a temperature exceeding said predetermined temperature, a thermostatic switch associated with said air outlet means having a temperature range substantially below said predetermined temperature and after detecting a temperature rise in air outlet temperature from said dryer indicating a reduction in the rate of heat absorption due to evaporation below the rate of heat input being adapted to cycle said air heating means off and on in response to variation of air outlet temperature within said range to reduce the temperature of the inlet air, a timer adapted to provide a terminal drying period of fixed duration and means for initiating operation of said timer in response to a drop in air inlet temperature below said predetermined temperature, said timer having means for terminating operation of said heating means after elapse of a fixed portion of said terminal period, means for shunting said first named thermostatic switch to free said timer from control thereby, means for suspending rotation of said drum, and a removable folding rack disposed within said drum for supporting laundry when drum rotation is suspended.

3. A laundry dryer comprising a motor driven tumbling drum, means for moving air through said drum including an inlet and an outlet, an inlet thermostatic switch associated with said inlet, and adapted to open at a predetermined elevated temperature in response to heated air flowing through said inlet, and close upon a drop in inlet air temperature, means for supplying heated air to said inlet at a temperature above said predetermined temperature, an outlet thermostatic switch associated with said outlet adapted to open at a temperature substantially below said predetermined temperature and close upon a drop in outlet temperature, and means for cycling said air heating means off and on in response to said outlet thermostat temperature after detecting a temperature rise in air outlet temperature from said dryer indicating a reduction in the rate of heat absorption due to evaporation below the rate of heat input, a timer having cam actuated contacts for completing a circuit to said air heating means except during a fixed run out period, a motor for driving said timer, timer cam controlled contacts connected in parallel with the contacts of said inlet thermostatic switch and adapted to energize said timer motor, said timer controlled contacts being adapted to open to suspend timer operation and preset the timer for a terminal period of fixed length greater than said run out period, and the contacts of said inlet thermostatic switch being adapted to close to energize said timer motor to initiate said terminal period upon a drop in inlet air temperature in response to the cycling of said outlet thermostat switch.

4. A laundry dryer comprising a tumbling drum, means for rotating said drum including a disengageable clutch, means for moving air through said drum including an inlet and an outlet, a thermostatic switch associated with said inlet, and adapted to open at a predetermined elevated temperature in response to heated air flowing through said inlet, and close upon a drop in inlet air temperature, means for supplying heated air to said inlet at a temperature above said predetermined temperature, a thermostatic switch associated with said outlet adapted to open at a temperature substantially below said predetermined temperature and close upon a drop in outlet temperature and means for cyling said air heating means off and on in response to said outlet thermostat temperature after detecting a temperature rise in air outlet temperature from said dryer indicating a reduction in the rate of heat absorption due to evaporation below the rate of heat input, a timer having cam actuated contacts for completing a circuit to said air heating means except during a fixed run out period, a motor for driving said timer, timer cam controlled contacts connected in parallel with the contacts of said first name thermostatic switch and adapted to energize said timer motor, said timer controlled contacts being adapted to open to suspend timer operation and preset the timer for a terminal period of fixed length greater than said run out period, and the contacts of said first thermostatic switch being adapted to close to energize said timer motor to initiate said terminal period upon a drop in inlet air temperature in response to the cycling of said second thermostat switch, manually operable switch means adapted to shunt said first named thermostatic switch and said timer controlled contacts, means for disengaging said clutch to stop drum rotation, and a folding removable rack disposed in said drum.

5. The method of drying laundry as recited in claim 1 wherein said laundry is cooled off during the remainder portion of said terminal period without heat input.

6. A laundry dryer comprising a tumbling drum, air inlet means for air outlet means associated with said drum, means for rotating the drum, means for causing a flow of air through the drum from said air inlet means to said air outlet means, an inlet thermostatic switch associated with said air inlet means adapted to open at a predetermined temperature, means associated with said air inlet means for heating air supplied thereto to a temperature exceeding said predetermined temperature, an outlet thermostatic switch associated with said air outlet means having a temperature range substantially below said predetermined temperature and after detecting a temperature rise in air outlet temperature from said dryer indicating a reduction in the rate of heat absorption due to evaporation below the rate of heat input being adapted to cycle said air heating means off and on in response to variation of air outlet temperature in said range to reduce the temperature of the inlet air, a timer adapted to provide a terminal drying period of fixed duration, means for initiating operation of said timer in response to a drop in air inlet temperature below said predetermined temperature to operate through said terminal drying period, a second outlet thermostatic switch is associated with said air outlet means and connected in parallel with said first mentioned outlet thermostatic switch, said second outlet thermostatic switch having a lower temperature range than said first mentioned outlet thermostatic switch, means is provided for rendering one or the other of said outlet thermostatic switches ineffective to cycle said air heating means off and on to select one of the temperature ranges of said outlet thermostatic switches, the low range thermostatic switch is provided with a biasing resistance to further lower the range thereof, and manually controlled means is provided for completing a circuit to said biasing resistance in shunt with said heating means.

References Cited

UNITED STATES PATENTS

| | | | |
|---|---|---|---|
| 2,547,238 | 4/1951 | Tremblay | 34—91 |
| 2,743,530 | 5/1956 | Smith et al. | 34—45 |
| 2,797,497 | 7/1957 | Engel et al. | 34—45 |
| 2,892,334 | 6/1959 | Gray | 34—45 |
| 2,972,817 | 2/1961 | Davidson | 34—45 |
| 2,983,129 | 5/1961 | Metzger | 34—45 |
| 3,022,987 | 2/1962 | Thorsheim | 34—45 |
| 3,045,993 | 7/1962 | Sidaris | 34—45 |
| 3,047,187 | 7/1962 | Taylor | 34—133 |
| 3,060,593 | 10/1962 | Flora | 34—133 |
| 3,066,422 | 12/1962 | Douglas | 34—133 |
| 3,071,864 | 1/1963 | Menk | 34—45 |
| 3,098,726 | 7/1963 | Stone | 34—133 |
| 3,112,187 | 11/1963 | Stone | 34—48 X |
| 3,157,475 | 11/1964 | Stainbrook | 34—91 |

FREDERICK L. MATTESON, JR., *Primary Examiner.*

NORMAN YUDKOFF, WILLIAM F. O'DEA,
*Examiners.*

W. C. EVERETT, D. A. TAMBURRO,
*Assistant Examiners.*